US012811434B2

(12) United States Patent
Belur

(10) Patent No.: US 12,811,434 B2
(45) Date of Patent: Nov. 24, 2026

(54) METHOD AND APPARATUS FOR IDENTIFYING DISTRIBUTED ENERGY RESOURCE SYSTEMS LOCATED BEHIND A TRANSFORMER WITHIN UTILITY GRID INFRASTRUCTURE

(71) Applicant: Enphase Energy, Inc., Petaluma, CA (US)

(72) Inventor: Raghuveer R. Belur, Los Altos, CA (US)

(73) Assignee: Enphase Energy, Inc., Petaluma, CA (US)

( * ) Notice: Subject to any disclaimer, the term of this patent is extended or adjusted under 35 U.S.C. 154(b) by 422 days.

(21) Appl. No.: 18/387,934

(22) Filed: Nov. 8, 2023

(65) Prior Publication Data

US 2024/0162744 A1 May 16, 2024

Related U.S. Application Data

(60) Provisional application No. 63/424,637, filed on Nov. 11, 2022.

(51) Int. Cl.

| | |
|---|---|
| ***H02J 13/12*** | (2026.01) |
| ***H02J 3/38*** | (2006.01) |
| *G06Q 50/06* | (2012.01) |
| *H02J 13/13* | (2026.01) |
| *H02J 101/20* | (2026.01) |
| *H02J 103/30* | (2026.01) |

(52) U.S. Cl.

CPC .............. *H02J 13/12* (2026.01); *H02J 3/381* (2013.01); *G06Q 50/06* (2013.01); *H02J 13/13* (2026.01); *H02J 2101/20* (2026.01); *H02J 2103/30* (2026.01)

(58) Field of Classification Search

USPC ............................................................ 702/60

See application file for complete search history.

(56) References Cited

U.S. PATENT DOCUMENTS

| | | | | |
|---|---|---|---|---|
| 2011/0025556 | A1 | 2/2011 | Bridges et al. | |
| 2012/0041696 | A1 | 2/2012 | Sanderford et al. | |
| 2017/0163037 | A1* | 6/2017 | Zimmanck | H02J 3/1878 |
| 2017/0363666 | A1* | 12/2017 | Alkuran | H02J 13/1323 |
| 2018/0316188 | A1 | 11/2018 | Ishchenko et al. | |
| 2019/0044378 | A1* | 2/2019 | Martinez | H02J 3/381 |
| 2022/0244076 | A1 | 8/2022 | Karlgaard et al. | |

(Continued)

FOREIGN PATENT DOCUMENTS

EP 3179594 A1 6/2017

OTHER PUBLICATIONS

International Search Report for PCT/US2023/036997, dated Mar. 12, 2024.

*Primary Examiner* — Paul D Lee

(74) *Attorney, Agent, or Firm* — Moser Taboada

(57) ABSTRACT

A method and apparatus for identifying distributed energy resource (DER) systems that are located behind a transformer of a utility grid infrastructure by receiving a power line communication (PLC) signal transmitted by at least one DER system, analyzing the PLC signal to determine if the PLC signal has characteristics indicating that the PLC signal was transmitted from a DER system that is behind the transformer and, if such characteristics are determined, transmitting an acknowledgement to the DER system that originated the transmission.

14 Claims, 2 Drawing Sheets

(56) References Cited

U.S. PATENT DOCUMENTS

| | | | | |
|---|---|---|---|---|
| 2022/0247188 | A1* | 8/2022 | Manikfan | G06Q 30/018 |
| 2023/0170694 | A1* | 6/2023 | Banerjee | H02J 3/00 |
| | | | | 703/18 |

* cited by examiner

METHOD AND APPARATUS FOR IDENTIFYING DISTRIBUTED ENERGY RESOURCE SYSTEMS LOCATED BEHIND A TRANSFORMER WITHIN UTILITY GRID INFRASTRUCTURE

RELATED APPLICATION

This application claims benefit to U.S. Provisional Patent Application Ser. No. 63/424,637 filed 11 Nov. 2022 entitled "Method and Apparatus for Identifying Distributed Energy Resource Systems Located Behind a Transformer within Utility Grid Infrastructure," which is hereby incorporated herein by reference in its entirety.

BACKGROUND

Field

Embodiments of the present invention generally relate to distributed energy production and consumption systems (i.e., distributed energy resource (DER) systems) and, in particular, to a method and apparatus for identifying DER systems located behind a transformer within utility grid infrastructure.

Description of the Related Art

A solar energy generation and storage system (Distributed Energy Resources (DERs)) typically comprises a number of components including, but not limited to, at least one energy source (e.g., solar panel and related power inverters), at least one storage element (e.g., battery system), at least one load (e.g., appliances) and/or at least one service panel to connect the DER components to the utility power grid. The solar panels are arranged in an array and positioned to maximize solar exposure. Each solar panel or small groups of panels may be coupled to an inverter (so-called micro-inverters) or all the solar panels may be coupled to a single inverter. The inverter(s) convert the DC power produced by the solar panels into AC power. The AC power is coupled to the service panel for use by a facility (e.g., home or business), supplied to the power grid, and/or coupled to a storage element such that energy produced at one time is stored for use at a later time. The at least one storage element may be one or more of batteries, fly wheels, hot fluid tank, hydrogen storage or the like. The most common storage element is a battery pack (i.e., a plurality of battery cells) having one or more bidirectional inverters coupled to the service panel to supply the batteries with DC power as well as allow the batteries to discharge through the inverter(s) to supply AC power to the facility when needed.

In addition, a number of components within a DER consume the generated power, e.g., load or consumption components such as appliances, electric vehicles, etc. Typically, the DER may be controlled by a controller to control loads and sources to locally balance energy production and consumption. Optimally, excess power produced by any individual DER system should be shared with energy consumers connected to the utility grid infrastructure. However, utility grid infrastructure interconnects a neighborhood of sites (homes and/or businesses). Within the infrastructure are power transformers that can be overloaded if too much power is coupled through the transformer. Typically, a group of sites are directly interconnected via low voltage transmission lines and site groups are connected to one another via transformers and high voltage transmission lines. Consequently, the transformers become bottlenecks in the transfer of power through the grid infrastructure.

To efficiently transfer energy between sites, it would be helpful to identify which sites are behind a transformer (e.g., connected directly with each other). Once the sites behind the transformer (BTT) are known, DER systems within the BTT group may transfer energy amongst themselves without regard to the transformer bottleneck.

Therefore, there is a need for a method and apparatus for identifying DER systems located behind the transformer.

SUMMARY

A method and apparatus for identifying DER systems located behind the transformer is provided substantially as shown in and/or described in connection with at least one of the figures, as set forth more completely in the claims.

Various features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the various features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise apparatus and methods for identifying DER systems located behind a transformer within a utility grid infrastructure. Embodiments of the invention comprise defining DER system groups (e.g., including groups of homes, business, apartment complexes, housing complexes, etc.), where each DER system within a DER group contains at least one local DER controller coupled to at least one load (e.g., electric appliances, electric vehicles, electric machinery, etc.) and at least one power producing asset (e.g., electric storage, solar panels, wind turbines, fuel cells, etc.). Since electric storage and electric vehicles may extract energy for storage as well as disgorge energy, these components may be viewed as behaving as both load and production assets. A DER group typically comprises a plurality of DERs that are connected to the utility power grid via a single transformer (e.g., a plurality of homes in a neighborhood that are connected to one another via the utility power grid infrastructure behind a transformer). The local DER controller(s) of DERs within a given group are capable of communicating to each other via power line communication (PLC) (i.e., each DER system comprises a PLC transceiver).

The PLC signals have a frequency, modulation and bandwidth that couples between DER systems but does not couple well through a utility grid transformer, i.e., the PLC signal is attenuated when transmitted through a grid transformer. In one embodiment, the PLC signals may have a carrier frequency of between 24 and 500 kHz, and, in a specific embodiment, use a carrier frequency of about 100 KHz. PLC signals may be modulated using amplitude modulation, Orthogonal Frequency Division Multiplexing (OFDM), Binary Phase Shift Keying (BPSK), Frequency Shift Keying (FSK), Spread-FSK (S-FSK) and the like. In other embodiments, other frequencies and modulation may be used. By monitoring the signal strength of a PLC signals transmitted amongst DER systems, embodiments of the invention are capable of determining which of the DER systems are behind the transformer (BTT).

Figure 1:
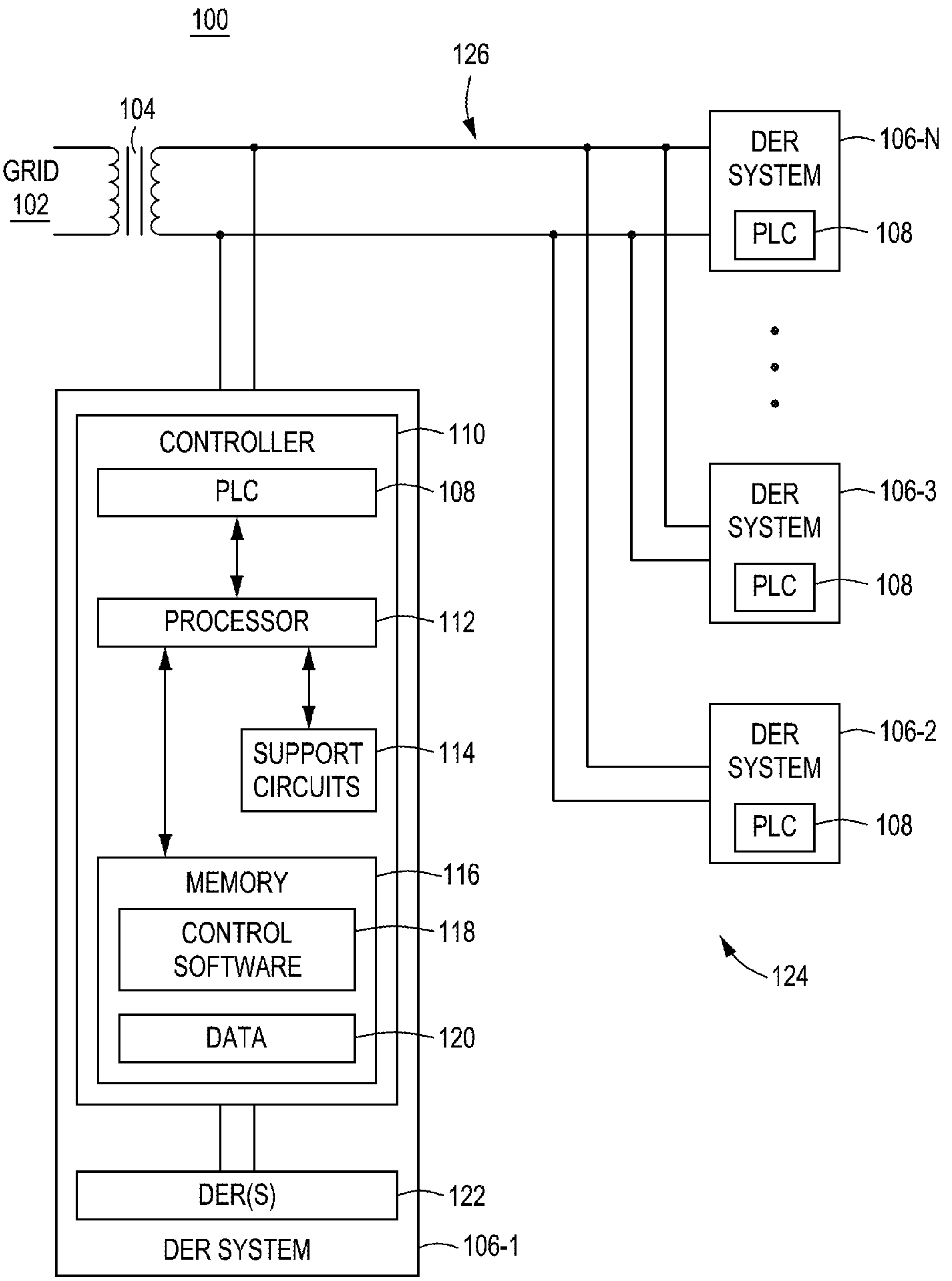
FIG. 1 depicts a block diagram of a distributed energy resource (DER) architecture in accordance with at least one embodiment of the invention.

FIG. 1 depicts a high-level block diagram of DER architecture 100 comprising a plurality of DER systems 106-1, 106-2, . . . 106-N (where N is an integer) that form a DER group 124 that is located behind the transformer 104. Each DER system 106 comprises a PLC transceiver 108 for communicating information within the DER system 106 as well as between DER systems 106 within the group 124. Information is carried by the portion 126 of the utility grid infrastructure 102 that is located BTT (behind the transformer). The portion 126 may be single phase, two phase or three phase. Each DER system 106 also comprises a DER controller 110 and DER(s) 122. The DER(s) 122 may produce, consume and/or store energy as described above. The controller 110 controls the DER activity as well as communicates information with other DER systems 106.

The controller 110 comprises at least one processor 112, support circuits 114 and memory 116. The at least one processor 112 may be any form of processor or combination of processors including, but not limited to, central processing units, microprocessors, microcontrollers, field programmable gate arrays, graphics processing units, and the like capable of executing software instructions to cause the controller to perform the functions described herein. The support circuits 114 may comprise well-known circuits and devices facilitating functionality of the processor(s). The support circuits 114 may comprise one or more of, or a combination of, power supplies, clock circuits, communications circuits, cache, displays, and/or the like.

The memory 116 comprises one or more forms of non-transitory computer readable media including one or more of, or any combination of, read-only memory or random-access memory. The memory 116 stores software and data including, for example, control software 118 and data 120. Data 120 may comprise at least one database containing the identity of DER systems that are behind the transformer. The database may be updated with DER system identifiers as the controller 110 identifies such systems as described below.

The control software 116 may comprise software instructions that, when executed by the at least one processor 112, cause the controller to monitor the status of the DERs 122 and communicate with other DER systems 106 within the group 124. The control software 118 is also executed to enable the DER system 106 to detect which other DER systems 106 are located BTT. Details of the operation of the control software 118 to perform BTT detection is described with respect to FIG. 2 below.

Figure 2:
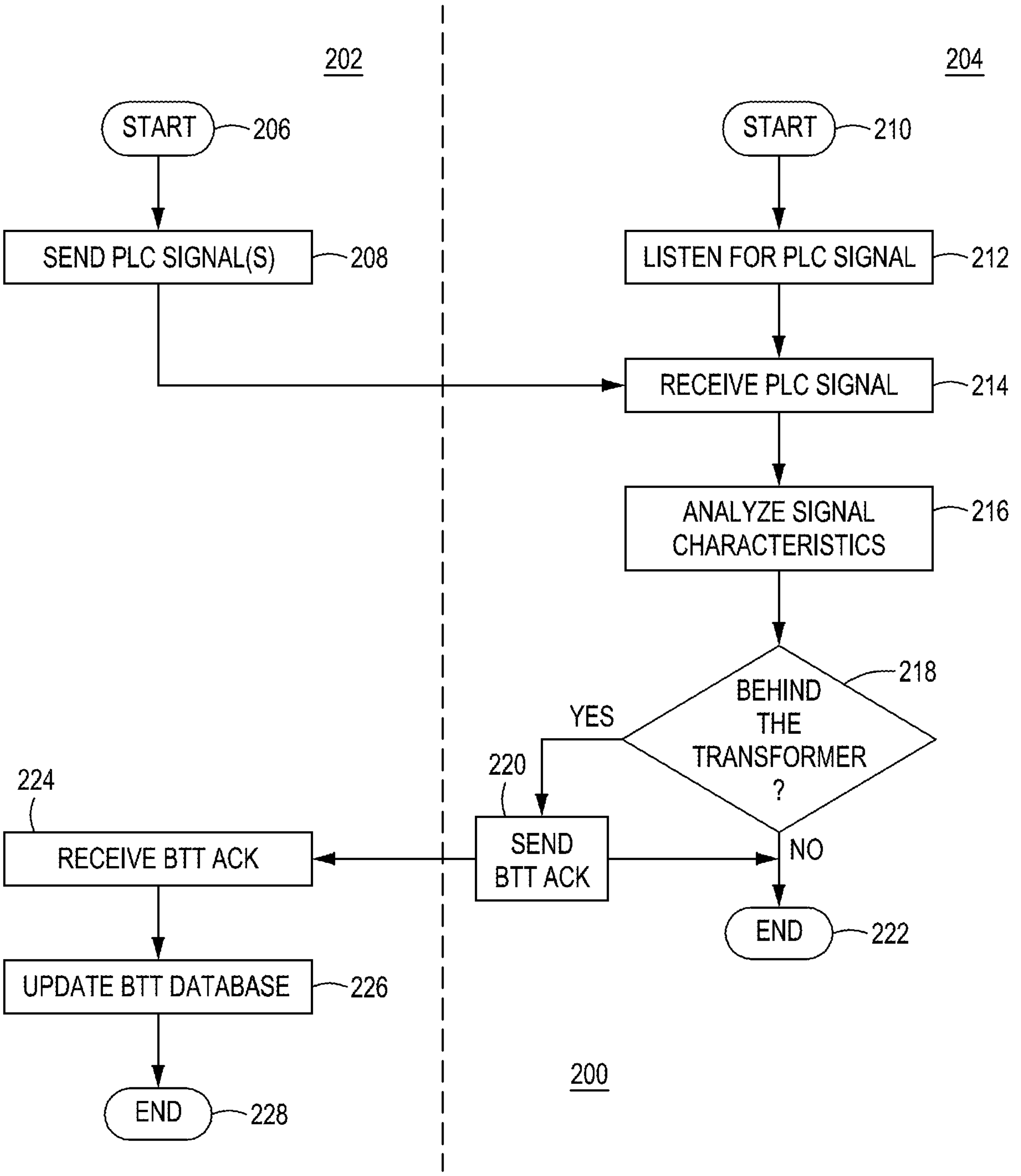
FIG. 2 depicts a flow diagram of operation of the DER architecture of FIG. 1 in accordance with at least one embodiment of the invention.

FIG. 2 depicts a flow diagram of a method 200 of operation of the control software 118 when executed by the at least one processor(s) of a controller 110 in accordance with at least one embodiment of the invention. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 2 depicts a method 200 that represents communications between two DER systems. One system is represented by the column 202 and the second system is represented by column 204. The method 200 begins at 206 and proceeds to 208 where the method 200 sends a PLC signal (a ping) onto the grid infrastructure wires. The transmission is generally not directed to any particular DER system such that any system connected to the infrastructure wiring may receive the PLC signal. The method 200 begins at the second DER system at 210 and proceeds to 212 where the method 200 listens for PLC signals. At 214, a PLC signal is received.

At 216, the method 200 analyzes the PLC signal. In one embodiment, the analysis involves measuring the signal strength of the received signal and comparing the signal strength to a threshold. If the PLC has passed through a transformer, the signal will be substantially attenuated. If the PLC is from a DER system that is BTT, the signal will be attenuated by the transmission losses of the wires and connections, but the attenuation will not be to the extent of the attenuation resulting from transmission through a transformer. Consequently, a signal from a DER system that is above the threshold is deemed BTT and below the threshold is not BTT. The PLC signal may contain a transmitting system identifier such that the receiving DER system can determine the identity of the DER system that is BTT. In this manner, the receiving DER system may update a BTT database with the identity of the transmitting DER system. With the knowledge that the transmitting DER system is BTT, the receiving system may exchange energy with the transmitting DER system because both systems are BTT.

At 218, the method 200 queries whether the PLC signal indicates BTT or not. If the signal is not BTT, the method ends at 222. If the PLC signal is deemed to be transmitted by a DER system that is BTT, the method 200 proceeds to 220. At 220, the method 200 transmits an acknowledgement (ACK) to the transmitting DER system. The ACK confirms to the transmitting DER system that the receiving DER system is BTT. Once the ACK is sent, the method ends for the second DER system at 222.

At 224, the method 200 receives the ACK at the first DER system. At 226, the method 200 updates the BTT database with the identity of the second DER system. The method 200 ends at 228.

All of the DER systems within a group transmit PLC signals to automatically determine which DER systems are BTT. The identity of the BTT systems are stored in a local database such that each DER system knows which other systems are BTT and eligible for energy transfer.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. An apparatus for identifying distributed energy resource (DER) systems that are located behind a transformer of a utility grid infrastructure comprising:

a controller configured to receive a power line communication (PLC) signal transmitted by at least one DER system and analyze the PLC signal to determine if the PLC signal was transmitted from a DER system that is behind the transformer, wherein a PLC signal strength of the PLC signal is compared to a threshold based on a first PLC signal that has been attenuated by losses associated with the transformer and a second PLC signal that has been attenuated by losses associated with the at least one DER system; and if the threshold is met, automatically transmit an acknowledgement to the DER system that originated the PLC transmission to indicate that energy coordination between the DER system that originated the PLC transmission and a DER system that received the PLC transmission is eligible.

2. The apparatus of claim 1 wherein the PLC signal comprises an identification of the DER system that transmitted the PLC signal.

3. The apparatus of claim 2 further comprising a database of DER systems that are determined to be behind the transformer.

4. The apparatus of claim 1 wherein the DER systems comprise at least one energy source and/or at least one energy storage element.

5. The apparatus of claim 1 wherein DER systems identified as behind the transformer are adapted to exchange energy with one another.

6. A method of identifying distributed energy resource (DER) systems that are located behind a transformer of a utility grid infrastructure comprising:

receiving a power line communication (PLC) signal transmitted by at least one DER system;

analyzing the PLC signal to determine if the PLC signal was transmitted from a DER system that is behind the transformer, wherein a PLC signal strength of the PLC signal is compared to a threshold based on a first PLC signal that has been attenuated by losses associated with the transformer and a second PLC signal that has been attenuated by loseses associated with the at least one DER system; and if the threshold is met, automatically transmitting an acknowledgement to the DER system that originated the PLC transmission to indicate that energy coordination between the DER system that originated the PLC transmission and a DER system that received the PLC transmission is eligible.

7. The method of claim 6 wherein the PLC signal comprises an identification of the DER system that transmitted the PLC signal.

8. The method of claim 7 further comprising storing the DER systems that are determined to be behind the transformer in a database.

9. The method of claim 6 wherein the DER systems comprise at least one energy source and/or at least one energy storage element.

10. The method of claim 6 wherein DER systems identified as behind the transformer are adapted to exchange energy with one another.

11. A non-transitory computer readable medium storing instructions that, when executed by at least one processor, cause the processor to perform a method of identifying distributed energy resource (DER) systems that are located behind a transformer of a utility grid infrastructure, the method comprising:

receiving a power line communication (PLC) signal transmitted by at least one DER system;

analyzing the PLC signal to determine if the PLC signal was transmitted from a DER system that is behind the transformer, wherein a PLC signal strength of the PLC signal is compared to a threshold based on a first PLC signal that has been attenuated by losses associated with the transformer and a second PLC signal that has been attenuated by loseses associated with the at least one DER system; and if the threshold is met, automatically transmitting an acknowledgement to the DER system that originated the PLC transmission to indicate that energy coordination between the DER system that originated the PLC transmission and a DER system that received the PLC transmission is eligible.

12. The computer readable medium of claim 11 wherein the PLC signal comprises an identification of the DER system that transmitted the PLC signal.

13. The computer readable medium of claim 12 further comprising storing the DER systems that are determined to be behind the transformer in a database.

14. The computer readable medium of claim 11 wherein the DER systems comprise at least one energy source and/or at least one energy storage element.

* * * * *